(12) United States Patent
Hsu et al.

(10) Patent No.: US 8,710,381 B2
(45) Date of Patent: Apr. 29, 2014

(54) KEYSWITCH CONTROLLER

(75) Inventors: Fu-Mei Hsu, Taoyuan Hsien (TW);
Ching-Hsiang Yu, Taoyuan Hsien (TW);
Shao-Hsiung Chang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 401 days.

(21) Appl. No.: 13/099,364

(22) Filed: May 3, 2011

(65) Prior Publication Data

US 2012/0228105 A1    Sep. 13, 2012

(30) Foreign Application Priority Data

Mar. 9, 2011   (TW) .............................. 100107838 A

(51) Int. Cl.
*H01H 9/26* (2006.01)

(52) U.S. Cl.
USPC ............................................... 200/5 A

(58) Field of Classification Search
USPC .......... 200/5 A, 5 R, 510–514, 6 R, 6 A, 339, 200/343; 463/37; 273/148 B
See application file for complete search history.

(56) References Cited

U.S. PATENT DOCUMENTS

| | | | |
|---|---|---|---|
| 6,599,196 B2 | 7/2003 | Kikukawa et al. | |
| 6,641,479 B1 * | 11/2003 | Ogata et al. | ........... 463/37 |
| 6,697,044 B2 | 2/2004 | Shahoian et al. | |
| 6,809,275 B1 | 10/2004 | Cheng et al. | |
| 6,824,468 B2 | 11/2004 | Murzanski et al. | |
| 7,061,466 B1 | 6/2006 | Moore et al. | |
| 7,106,313 B2 | 9/2006 | Schena et al. | |
| 7,377,851 B2 * | 5/2008 | Goto et al. | ........... 463/37 |
| 8,263,889 B2 * | 9/2012 | Takahashi et al. | ........... 200/512 |
| 2007/0182708 A1 | 8/2007 | Poupyrev et al. | |

FOREIGN PATENT DOCUMENTS

| | | |
|---|---|---|
| JP | 60-253121 | 12/1985 |
| JP | 62-206719 | 9/1987 |
| JP | 7-50118 | 2/1995 |
| JP | 2000-123678 | 4/2000 |
| JP | 2002-124151 | 4/2002 |
| JP | 2002-318658 | 10/2002 |
| JP | 2004-033371 | 2/2004 |
| TW | 584570 | 4/2004 |
| TW | M324245 | 12/2007 |
| TW | 201009540 | 3/2010 |

* cited by examiner

*Primary Examiner* — Edwin A. Leon
(74) *Attorney, Agent, or Firm* — CKC & Partners Co., Ltd.

(57) ABSTRACT

A keyswitch controller includes a housing, a circuit board, a keyswitch module, and a force feedback module. The housing includes a keyswitch hole. The circuit board is disposed in the housing and includes a switch. The keyswitch module disposed on the circuit board and passing out of the keyswitch hole is for turning on the switch by being pressed so as to generate a pressing signal. The force feedback module is coupled to the keyswitch module for vibrating according to the pressing signal.

5 Claims, 8 Drawing Sheets

KEYSWITCH CONTROLLER

RELATED APPLICATIONS

This application claims priority to Taiwan Application Serial Number 100107838, filed on Mar. 9, 2011, which is herein incorporated by reference.

BACKGROUND

1. Field of Invention

The present invention relates to a keyswitch controller.

2. Description of Related Art

In order to provide highly telepresence to users, general game systems tend to apply force feedback designs. A common family video game system is capable of providing vibration on its control handle. In some special scenes of a game, the physical feedback generated by vibration will provide the users with a spectacular sense of actually being there.

Although current handheld game consoles (e.g. Sony PSP, Nintendo NDSL, and etc.) and video game systems (e.g. Sony PS3, Nintendo Wii, Microsoft XBOX 360, and etc.) are desired to provide innovative inputting approaches with their control handles, the keyswitches still can not be omitted. The most complicated and minute feeling in five senses of humans is the sense of touch, and the most sensitive fingers touch the keyswitches. For example, while touching a cup contains hot tea, we can feel hot and smooth. For another example, while rubbing the thumb against the forefinger, we can feel fine fingerprint.

However, a current force feedback device is always disposed at the control handle of game system, so the force feedback will transfer to the palm of the user. During the operation, the force feedback device installed in the housing of the control handle will vibrate the whole control handle. Owing to the foregoing conditions, the eccentric balance-weight of the current force feedback device cannot be too small. Thus, the current force feedback device has following two shortcomings:

(1) The controlling of starting or stopping of the force feedback device is uneasy (i.e. it takes time to start or stop); and (2) it needs larger energy to rotate a larger eccentric balance-weight.

Current handheld game consoles cannot be equipped with force feedback device because the convenience of carrying is highly considered. In other words, the weight of a handheld game console will be considered preferentially. Under the consideration, the weight of the eccentric balance-weight becomes a big load to the handheld game console.

SUMMARY

In order to solve the problems of prior arts, a keyswitch controller according to an embodiment of the invention is provided. The force feedback module is disposed on the keyswitch module of the keyswitch controller rather than on the housing near the handle portion, and the force feedback module can directly execute force feedback behavior to the keyswitch module according to the pressing action of a user. Because the main feedback object of the force feedback module is the keyswitch module, the user will feel more satisfaction about the force feedback transmitted from the keyswitch module. Furthermore, because the weight of the keyswitch module is lighter, the adopted force feedback module can be smaller. The smaller force feedback module is easy to start and stop, so a variety of feelings of force feedback can be developed easily. Moreover, the smaller force feedback module also consumes less energy.

According to an embodiment of the invention, the keyswitch controller includes a housing, a circuit board, a keyswitch module, and a force feedback module. The housing includes a keyswitch hole. The circuit board is disposed in the housing. The circuit board includes a switch. The keyswitch module is disposed on the circuit board and protrudes out of the keyswitch hole. The keyswitch module can turn on the switch by being pressed so as to generate a pressing signal. The force feedback module is coupled to the keyswitch module. The force feedback module can be used to vibrate according to the pressing signal.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
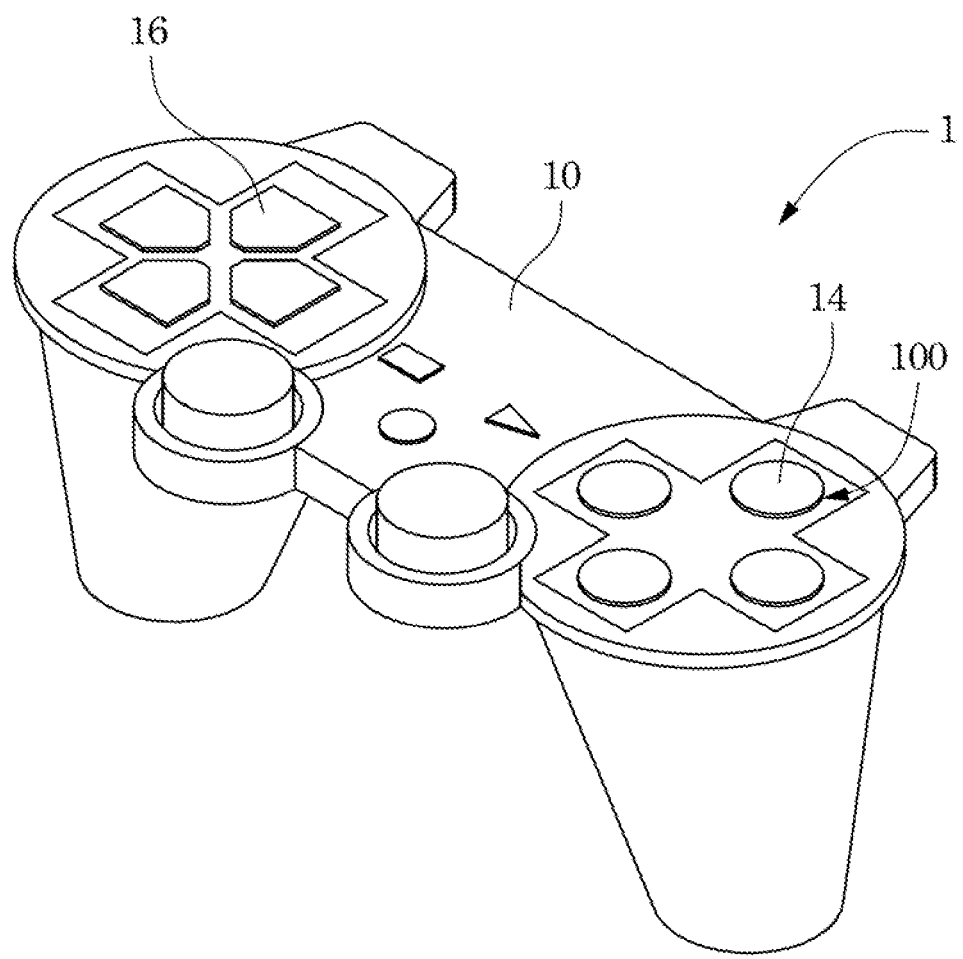
FIG. 1 is a perspective view showing a keyswitch controller according to an embodiment of the invention.

Reference will now be made in detail to the present embodiments of the invention, examples of which are illustrated in the accompanying drawings. Wherever possible, the same reference numbers are used in the drawings and the description to refer to the same or like parts.

A keyswitch controller according to an embodiment of the invention is provided. Specifically, the force feedback module is disposed on the keyswitch module of the keyswitch controller rather than on the housing near the handle portion, and the force feedback module can directly execute force feedback behavior to the keyswitch module according to the pressing action of a user. Because the main feedback object of the force feedback module is the keyswitch module, the user will feel more satisfaction about the force feedback transmitted from the keyswitch module. Furthermore, because the weight of the keyswitch module is lighter, the adopted force feedback module can be smaller. The smaller force feedback module is easy to start and stop, so a variety of feelings of force feedback can be developed easily. Moreover, the smaller force feedback module also consumes less energy.

Please refer to FIG. 1. FIG. 1 is a perspective view showing a keyswitch controller 1 according to an embodiment of the invention.

As shown in FIG. 1, the keyswitch controller 1 of the embodiment can be, but not limited to, video game systems (e.g. Sony PS3, Nintendo Wii, Microsoft XBOX 360, and etc.), handles of PC games, or handheld game consoles (e.g. Sony PSP, Nintendo NDSL, and etc.). In other words, the keyswitch controller 1 of the invention can be any electronic device having a keyswitch module. The concepts of the keyswitch controller 1 disclosed by the invention can be applied to provide force feedback effect as long as the requirement for force feedback is needed during operation.

As shown in FIG. 1, the keyswitch controller 1 of the embodiment mainly includes a housing 10, a first keyswitch module 14, and a second keyswitch module 16. The housing 10 includes keyswitch holes 100. The quantity and locations of the keyswitch holes 100 can be designed corresponding to the structural designs of the first keyswitch module 14 and the second keyswitch module 16. The structure of each component in the housing 10 of the keyswitch controller 1 of the embodiment will be introduced in detail.

Figure 2A:
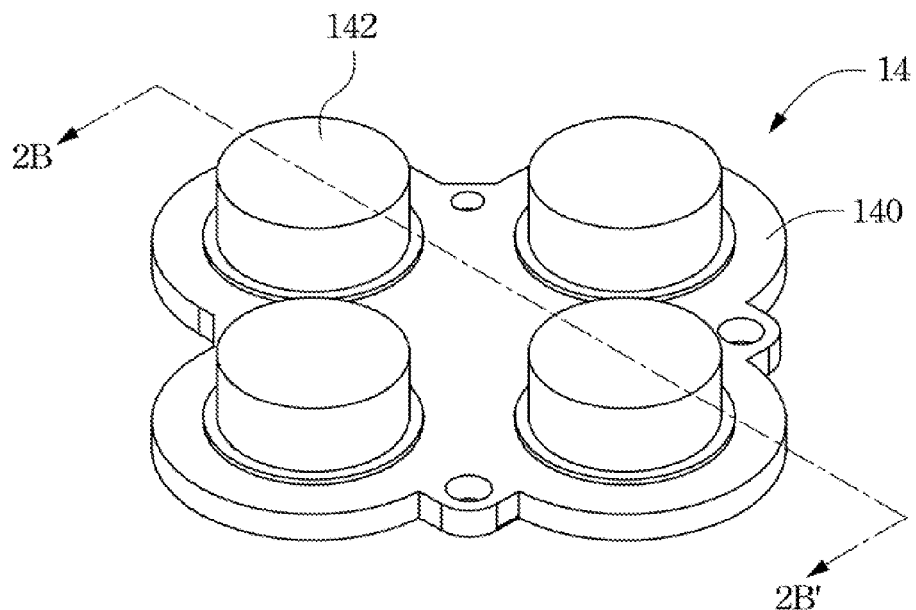
FIG. 2A is a perspective view showing the first keyswitch module in FIG. 1.
Figure 2B:
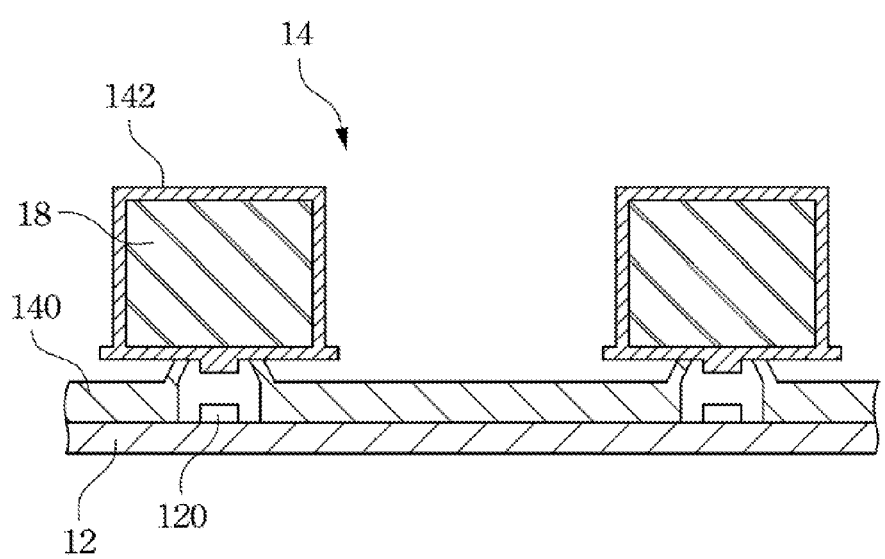
FIG. 2B is a sectional view showing the first keyswitch module along line 2B-2B' in FIG. 2A, wherein the first keyswitch module is disposed on the circuit board.

Please refer to FIG. 2A and FIG. 2B. FIG. 2A is a perspective view showing the first keyswitch module 14 in FIG. 1. FIG. 2B is a sectional view showing the first keyswitch module 14 along line 2B-2B' in FIG. 2A, wherein the first keyswitch module 14 is disposed on the circuit board 12.

As shown in FIG. 2A and FIG. 2B, the keyswitch controller 1 of the embodiment can further include the circuit board 12 and a force feedback module 18. The circuit board 12 can be installed in the housing 10 of the keyswitch controller 1. The circuit board 12 can include a switch 120. The first keyswitch module 14 can be installed on the circuit board 12 and protrude out of the keyswitch holes 100 of the housing 10. The first keyswitch module 14 can turn on the switch 120 of the circuit board 12 by being pressed so as to generate a pressing signal. The force feedback module 18 can be installed on the first keyswitch module 14. The force feedback module 18 can be used to vibrate according to the pressing signal.

As shown in FIG. 2B, the first keyswitch module 14 of the keyswitch controller 1 can further include a resilient portion 140 and a main body portion 142. The resilient portion 140 of the first keyswitch module 14 can be detachably installed on the circuit board 12. The main body portion 142 of the first keyswitch module 14 can be connected to the resilient portion 140 and entirely wrap the force feedback module 18. During the manufacturing of the first keyswitch module 14, the resilient portion 140 and the main body portion 142 of the first keyswitch module 14 can be manufactured by co-injection molding. Further, the force feedback module 18 can be wrapped in the main body portion 142 during the injection process of the main body portion 142 of the first keyswitch module 14.

Generally, in order to be pressed by users, the material of the main body portion 142 of the first keyswitch module 14 can be harder plastic. Relatively, in order to make the main body portion 142 of the first keyswitch module 14 can turn on the switch 120 of the circuit board 12 while being pressed downward, the material of the resilient portion 140 of the first keyswitch module 14 can be softer plastic (e.g. rubber) that is easy to deform. Therefore, the switch 120 can be turned on when the main body portion 142 of the first keyswitch module 14 is pressed downward to contact the circuit board 12 so as to generate the pressing signal.

Figure 3A:
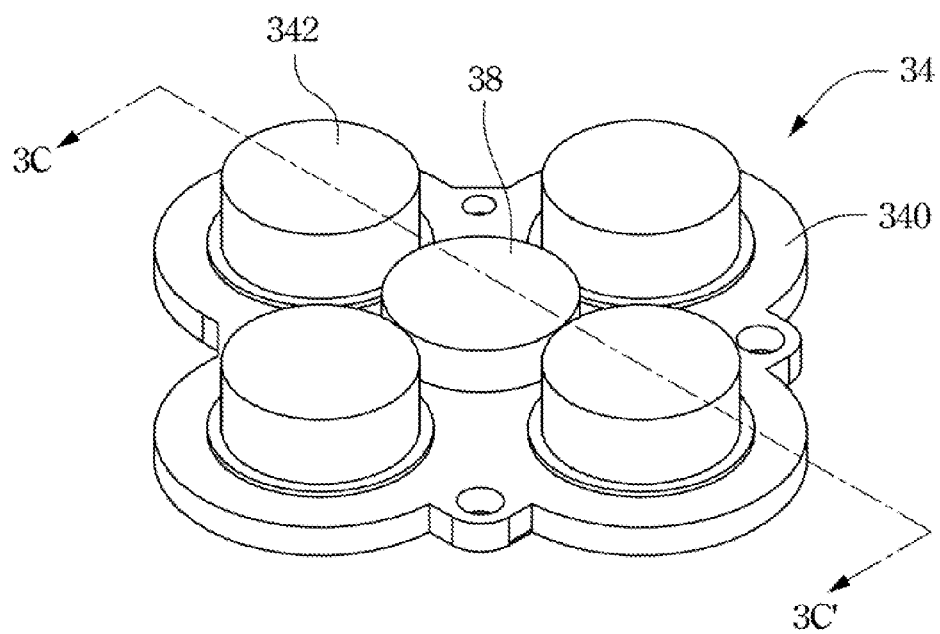
FIG. 3A is a perspective view showing another embodiment of the first keyswitch module.
Figure 3B:
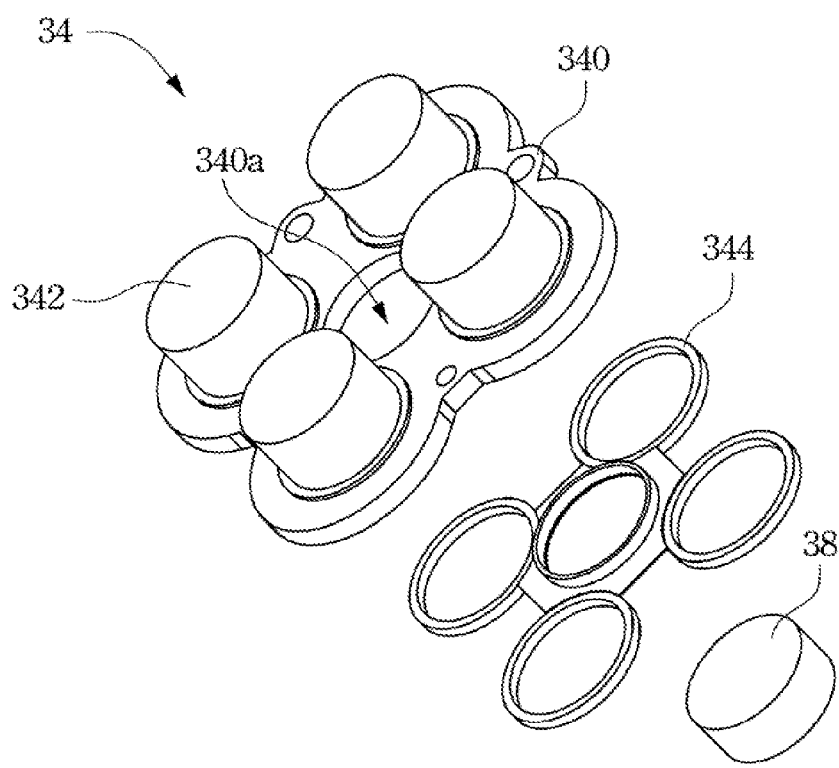
FIG. 3B is an exploded view showing the first keyswitch module in FIG. 3A.
Figure 3C:
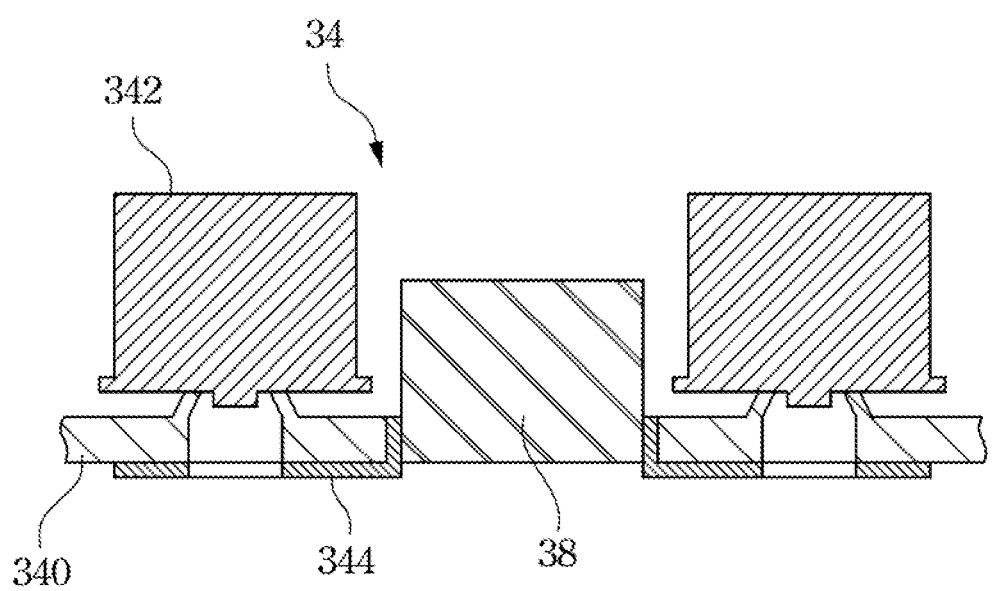
FIG. 3C is a sectional view showing the first keyswitch module along line 3C-3C' in FIG. 3A.

Please refer to FIG. 3A, FIG. 3B, and FIG. 3C. FIG. 3A is a perspective view showing another embodiment of the first keyswitch module 14 in FIG. 1. FIG. 3B is an exploded view showing the first keyswitch module 34 in FIG. 3A. FIG. 3C is a sectional view showing the first keyswitch module 34 along line 3C-3C' in FIG. 3A.

As shown in FIG. 3A, FIG. 3B, and FIG. 3C, the first keyswitch module 34 of the embodiment of the keyswitch controller 1 also includes a resilient portion 340 and a main body portion 342. The difference between the first keyswitch module 34 of the embodiment and the first keyswitch module 14 of the embodiment in FIG. 2B is that the first keyswitch module 34 further includes an aperture 340a. The aperture can be located on the resilient portion 340 of the first keyswitch module 34 and passed through by the force feedback module 38. Therefore, the first keyswitch module 34 of the embodiment can further include a mounting bracket 344. The mounting bracket 344 can be installed on the resilient portion 340 for mounting the force feedback module 38. The mounting bracket 344 can be engaged with the aperture 340a on the resilient portion 340. Because the main body portion 342 will compress the resilient portion 340 and the mounting bracket 344 while being pressed downward, the force feedback module 38 will vibrate the whole mounting bracket 344 so as to transmit the vibration force to the user via the main body portion 342 of the first keyswitch module 34. Consequently, the embodiment can provide users sufficient effect of force feedback.

Figure 4A:
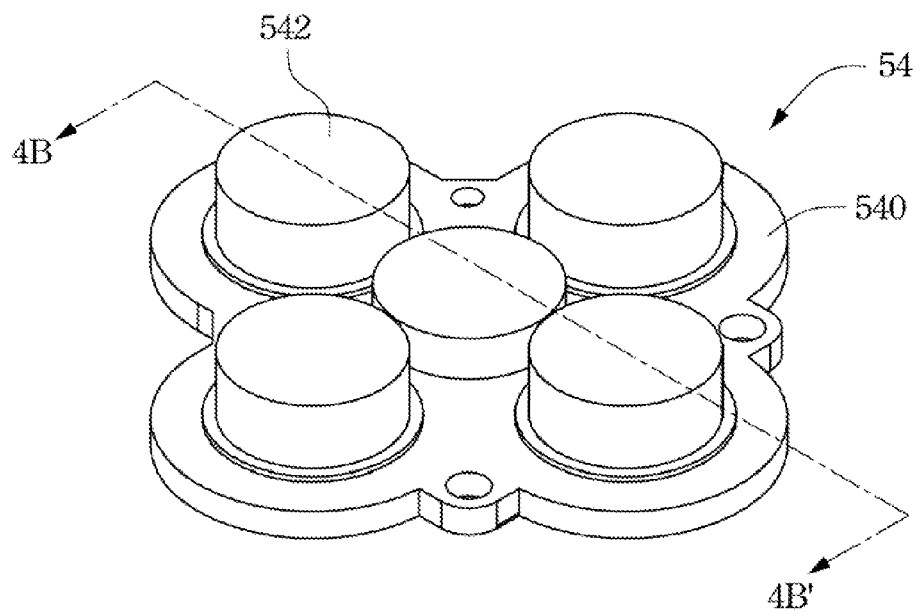
FIG. 4A is a perspective view showing another embodiment of the first keyswitch module in FIG. 1.
Figure 4B:
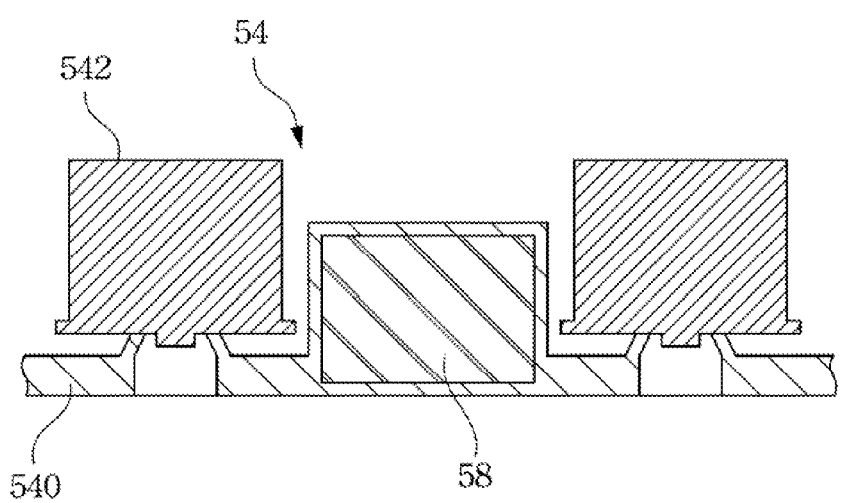
FIG. 4B is a sectional view showing the first keyswitch module along line 4B-4B' in FIG. 4A.

Please refer to FIG. 4A and FIG. 4B. FIG. 4A is a perspective view showing another embodiment of the first keyswitch module 14 in FIG. 1. FIG. 4B is a sectional view showing the first keyswitch module 54 along line 4B-4B' in FIG. 4A.

As shown in FIG. 4A and FIG. 4B, the first keyswitch module 54 of the embodiment of the keyswitch controller 1 also includes a resilient portion 540 and a main body portion 542. The difference between the first keyswitch module 34 of the embodiment and the first keyswitch module 14 of the embodiment in FIG. 2B is that the resilient portion 540 of the first keyswitch module 54 entirely wraps the force feedback module 58. During the manufacturing processes of the first keyswitch module 54, the force feedback module 58 can be wrapped in the resilient portion 540 during the injection molding of the resilient portion 540 of the first keyswitch module 54. Consequently, the first keyswitch module 54 of the embodiment can also provide users sufficient effect of force feedback. Of course, if the material cost is concerned, the resilient portion 540 of the first keyswitch module 54 can also partially wrap the force feedback module 58 to provide the effect of force feedback.

Figure 5A:
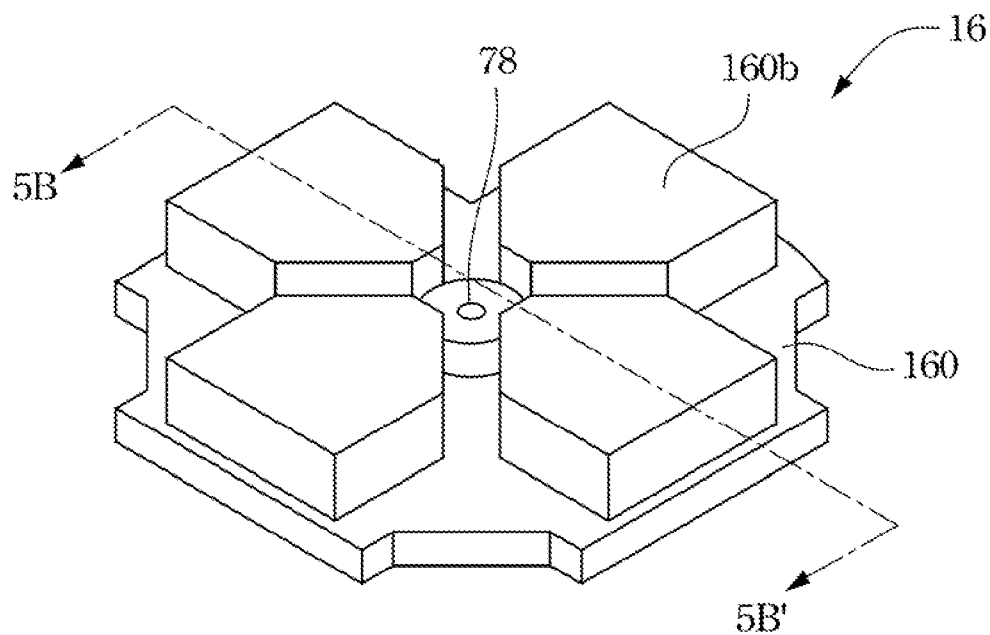
FIG. 5A is a perspective view showing the second keyswitch module in FIG. 1.
Figure 5B:
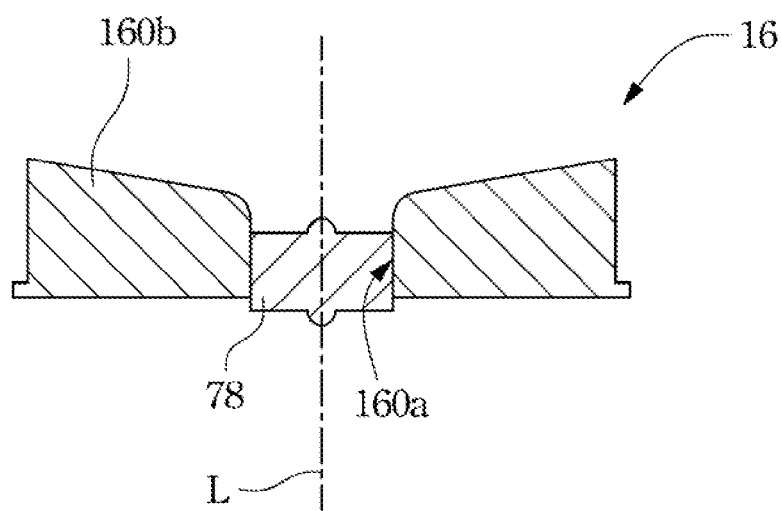
FIG. 5B is a sectional view showing the second keyswitch module along line 5B-5B' in FIG. 5A.

Please refer to FIG. 5A and FIG. 5B. FIG. 5A is a perspective view showing the second keyswitch module 16 in FIG. 1. FIG. 5B is a sectional view showing the second keyswitch module 16 along line 5B-5B' in FIG. 5A.

As shown in FIG. 5A and FIG. 5B, the second keyswitch module 16 of the embodiment of the keyswitch controller 1 can include a main body portion 160. The second keyswitch module 16 can include a plurality of keyswitch units 160b and the keyswitch units 160b surround the rotation axis L. The difference between the second keyswitch module 16 of the embodiment and the first keyswitch module 14, 34, or 54 is that the second keyswitch module 16 only includes a main body portion 160 without a resilient portion. In other words, the whole structure of the second keyswitch module 16 can be manufactured by injection molding. The quantity of the keyswitch units 160b is not limited to FIG. 5A and FIG. 5B and can be adjusted according to practical requirements.

As shown in FIG. 5B, the second keyswitch module 16 of embodiment can further include an aperture 160a. The aperture 160a is located on the main body portion 160 of the second keyswitch module 16. The rotation axis L of the main body portion 160 passes through the aperture 160a. The keyswitch units 160b surround the aperture 160a, and the force feedback module 78 engages with the aperture 160a. In other words, the aperture 160a restrains the force feedback module 78 from moving. Because the main body portion 160 of the second keyswitch module 16 is an integral structure, the main body portion 160 can be detachably installed on the circuit board 12 in FIG. 2B. When the second keyswitch module 16 is not pressed, the rotation axis L of the main body portion 160 is perpendicular to the circuit board 12. When the second keyswitch module 16 is pressed, the rotation axis L of the main body portion 160 will incline toward the direction in which the second keyswitch module 16 is pressed.

Besides, because users will press the main body portion 160 of the second keyswitch module 16, the main body portion 160 can be manufactured by harder plastic. Owing to being manufactured by harder plastic, the second keyswitch module 16 of the embodiment will provide users stronger effect of force feedback when the force feedback module 78 vibrates.

Figure 6:
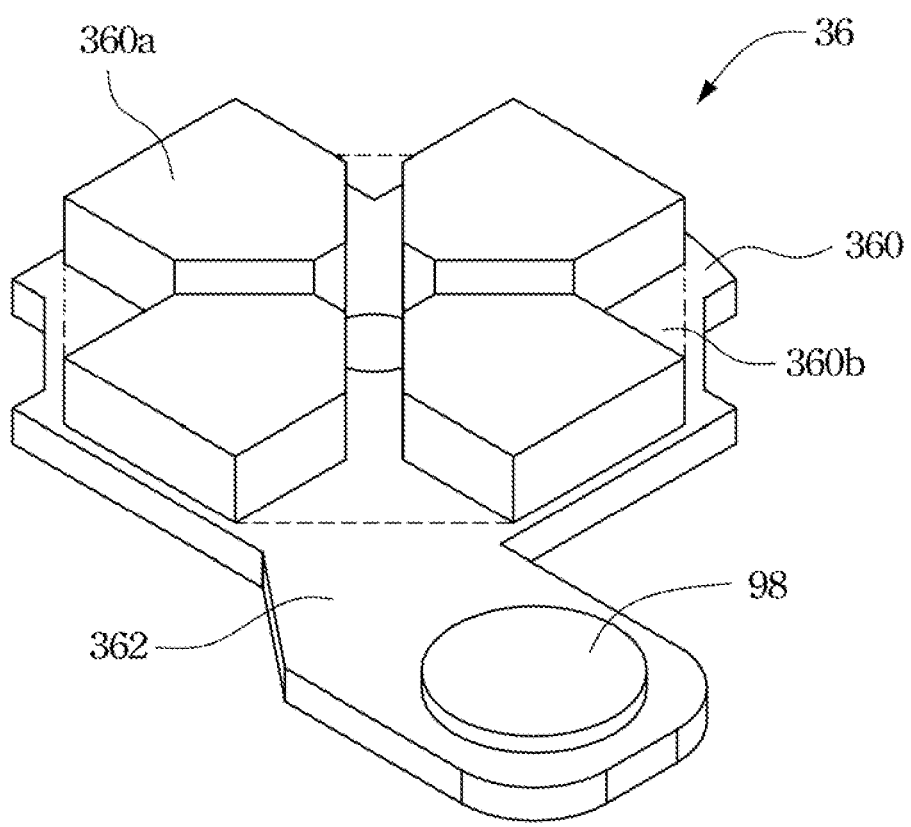
FIG. 6 is a perspective view showing another embodiment of the second keyswitch module in FIG. 1.

Please refer to FIG. 6. FIG. 6 is a perspective view showing another embodiment of the second keyswitch module 16 in FIG. 1.

As shown in FIG. 6, the second keyswitch module 36 of the embodiment also includes a main body portion 360, and the main body portion 360 also includes a plurality of keyswitch units 360a. The difference between the second keyswitch module 36 of the embodiment and the second keyswitch module 16 of the embodiment in FIG. 5A is that the second keyswitch module 36 further includes an extension portion 362. The extension portion 362 of the second keyswitch module 36 is connected with the main body portion 360 and located outside a region 360b surrounded by the keyswitch units 360a. In other words, the extension portion 362 of the second keyswitch module 36 is extended out from the main body portion 360, and the extension portion 362 and the main body portion 360 can be manufactured integrally by injection molding. The force feedback module 98 can be installed on the extension portion 362. Similarly, owing to being manufactured by harder plastic, the second keyswitch module 36 of the embodiment will provide users stronger effect of force feedback when the force feedback module 98 vibrates. The quantity of the keyswitch units 360a is not limited as shown in FIG. 6 and can be adjusted according to practical requirements.

Figure 7A:
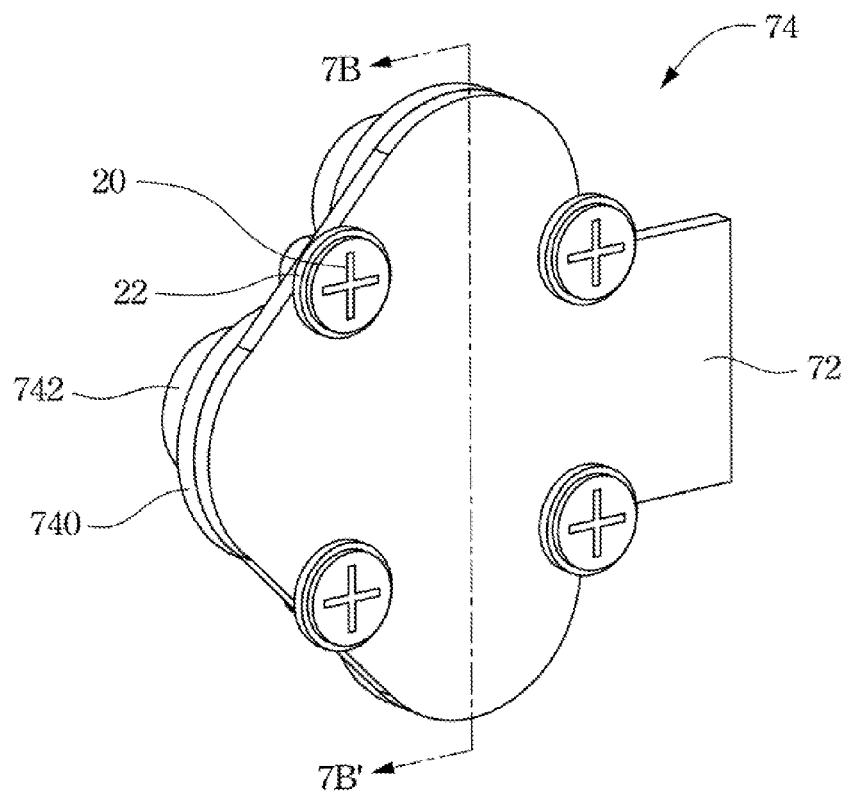
FIG. 7A is a perspective view showing an embodiment that the first keyswitch module is screwed to the circuit board.
Figure 7B:
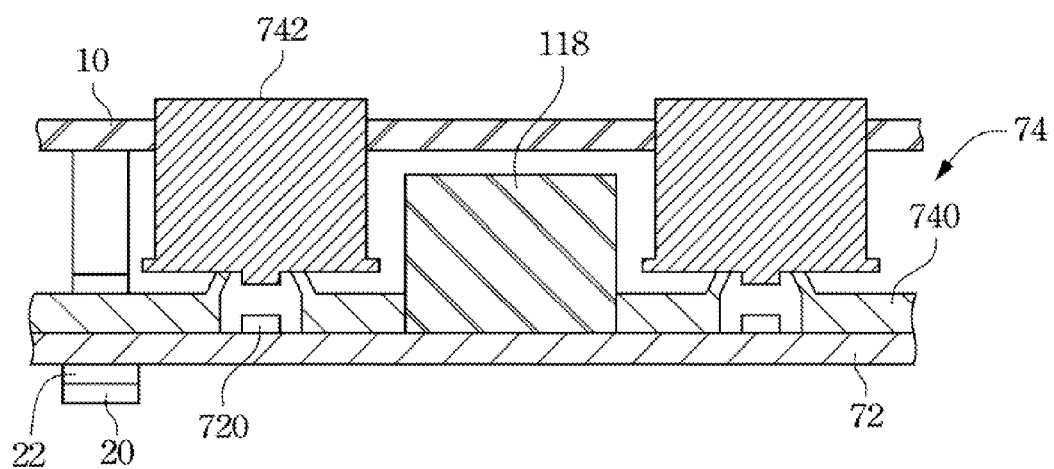
FIG. 7B is a sectional view showing the first keyswitch module and the circuit board along line 7B-7B' in FIG. 7A, wherein the first keyswitch module and the circuit board are mounted on the housing.

Please refer to FIG. 7A and FIG. 7B. FIG. 7A is a perspective view showing an embodiment that the first keyswitch module 74 is screwed to the circuit board 72. FIG. 7B is a sectional view showing the first keyswitch module 74 and the circuit board 72 along line 7B-7B' in FIG. 7A, wherein the first keyswitch module 74 and the circuit board 72 are mounted on the housing 10.

As shown in FIG. 7A and FIG. 7B, the first keyswitch module 74 of the embodiment also includes a resilient portion 740 and a main body portion 742. Similarly, the resilient portion 740 of the first keyswitch module 74 is detachably installed on the circuit board 72, and the main body portion 742 of the first keyswitch module 74 can be connected to the resilient portion 740. When the main body portion 742 of the first keyswitch module 74 is pressed downward, the resilient portion 740 will deform to turn on the switch 720 of the circuit board 72. The difference between the first keyswitch module 74 of the embodiment and the first keyswitch module 14 of the embodiment in FIG. 2B is that the force feedback module 118 is directly installed on the circuit board 72. In other words, because the main body portion 742 will compress the resilient portion 740 and the circuit board 72 while being pressed downward, the force feedback module 118 will vibrate the whole circuit board 72 so as to transmit the vibration force to the user via the main body portion 742 of the first keyswitch module 74. Consequently, the embodiment can provide users sufficient effect of force feedback.

As shown in FIG. 7B, the keyswitch controller 1 of the embodiment can further include a screw 20 and a resilient member 22. The screw 20 can be used to screw the circuit board 72 to the housing 10. The resilient member 22 can be sandwiched between the head portion of the screw 20 and the circuit board 72. Therefore, the effect of force feedback transmitted from the force feedback module 118 to the circuit board 72 and the screw 20 will buffer the main body portion 742 so that the effect of force feedback will not be further transmitted to the housing 10 of the keyswitch controller 1.

In an embodiment, mounting members such as a bolt, a hook, and etc can also replace the foregoing screw 20. The goal of reducing the effect of force feedback to be transmitted to the housing 10 of the keyswitch controller 1 can be achieved as long as the resilient member 22 is buffered between the mounting member and the circuit board 72. In an embodiment, the resilient member 22 can be a member that can provide buffering function between the mounting member and the circuit board 72, such as a washer, a spring, and etc.

According to the foregoing recitations of the embodiments of the invention, the keyswitch controller of the invention mainly includes following advantages. The force feedback module is disposed on the keyswitch module of the keyswitch controller rather than on the housing near the handle portion, and the force feedback module can directly execute force feedback behavior to the keyswitch module according to the pressing action of a user. Because the main feedback object of the force feedback module is the keyswitch module, the user will feel more satisfaction about the force feedback transmitted from the keyswitch module. Furthermore, because the weight of the keyswitch module is lighter, the adopted force feedback module can be smaller. The smaller force feedback module is easy to start and stop, so a variety of feelings of force feedback can be developed easily. Moreover, the smaller force feedback module also consumes less energy.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A keyswitch controller comprising:
   a housing comprising a keyswitch hole;
   a circuit board being disposed in the housing and comprising a switch;
   a keyswitch module disposed on the circuit board and protruding out of the keyswitch hole for turning on the switch by being pressed so as to generate a pressing signal, wherein the keyswitch module comprises:
   a resilient portion detachably disposed on the circuit board;

a main body portion connected with the resilient portion; and a mounting bracket disposed on the resilient portion; and a force feedback module coupled to the keyswitch module for vibrating according to the pressing signal, wherein the mounting bracket mounts the force feedback module.

2. The keyswitch controller of claim 1, wherein the keyswitch module further comprises an aperture located on the resilient portion for being passed through by the force feedback module.

3. The keyswitch controller of claim 2, wherein a material of the main body portion is harder plastic, and a material of the resilient portion is softer plastic or rubber.

4. The keyswitch controller of claim 2, wherein the mounting bracket is engaged with the aperture, and the force feedback module is located within the aperture and engaged by the mounting bracket.

5. The keyswitch controller of claim 4, wherein when the main body portion is pressed downward, the main body portion compresses the resilient portion and the mounting bracket, and thus the force feedback module vibrates the mounting bracket so as to transmit the vibration force to the main body portion.

* * * * *